United States Patent [19]

Johnson

[11] 4,407,063
[45] Oct. 4, 1983

[54] METHOD AND APPARATUS FOR FABRICATING BATTERY PLATE ENVELOPES

[76] Inventor: Peter E. Johnson, 500 Crescent Valley Dr., Corvallis, Oreg. 97330

[21] Appl. No.: 311,002

[22] Filed: Oct. 13, 1981

Related U.S. Application Data

[63] Continuation-in-part of Ser. No. 250,892, Apr. 3, 1981, abandoned.

[51] Int. Cl.³ .............................................. H01M 2/14
[52] U.S. Cl. .................................... 29/623.2; 29/730; 493/390; 493/464
[58] Field of Search ...................... 29/730, 731, 623.1, 29/623.2, 623.3, 623.4; 53/206, 228, 371; 429/139; 493/254, 390, 464

[56] References Cited

U.S. PATENT DOCUMENTS

| 1,697,212 | 1/1929 | Von Vago et al. ................. 493/464 |
| 2,570,677 | 10/1951 | Honey et al. ........................ 429/139 |
| 3,271,223 | 9/1966 | Sudo ................................. 156/244.27 |
| 3,351,495 | 11/1967 | Larsen et al. ........................ 429/252 |
| 3,843,483 | 10/1974 | Sendor et al. ..................... 156/380.3 |
| 3,900,341 | 8/1975 | Shoichiro et al. .................. 429/139 |
| 4,026,000 | 5/1977 | Anderson ................................ 29/730 |
| 4,026,000 | 5/1977 | Anderson ................................ 29/730 |
| 4,080,727 | 3/1978 | Stolle et al. ......................... 29/623.4 |
| 4,125,424 | 11/1978 | Vecchiotti et al. ................. 156/550 |
| 4,161,815 | 7/1979 | Land et al. .......................... 29/623.4 |
| 4,216,579 | 8/1980 | Murata et al. ......................... 29/730 |
| 4,314,403 | 2/1982 | Sanekata ........................... 29/623.2 |

Primary Examiner—Francis S. Husar
Assistant Examiner—Jonathan L. Scherer
Attorney, Agent, or Firm—Chernoff, Vilhauer, McClung, Birdwell & Stenzel

[57] ABSTRACT

A method and apparatus are provided for fabricating battery plate envelopes from a sheet formed of microporous plastic material having a width greater than that of a battery plate to be enveloped. A battery plate is pushed edgewise into the sheet to fold the sheet about the battery plate with edges overlapping the battery plate on both sides. The folded sheet is fed with the battery plate therein into the interface between a pair of opposed pressure rollers each of which include a pair of axially aligned sealing wheels. A continuous seal is formed between the overlapping edges of the sheet by compressing the edges into one another between the sealing wheels. Each set of sealing wheels may comprise gear teeth whose teeth continuously mesh with those of the teeth mounted on the opposing pressure roller.

20 Claims, 6 Drawing Figures

METHOD AND APPARATUS FOR FABRICATING BATTERY PLATE ENVELOPES

BACKGROUND OF THE INVENTION

This is a continuation-in-part application of my prior application by the same title filed Apr. 3, 1981, Ser. No. 250,892, now abandoned.

The invention relates to a battery plate insulator sealing system. More particularly, the invention relates to a method and apparatus for fabricating battery plate envelopes from a sheet of microporous material.

In a wet cell storage battery, it is often desirable to enclose either the positive or the negative battery plates within an envelope. The envelopes serve two distinct purposes. First, the envelopes insulate the oppositely charged plates. Second, the envelopes prevent material from falling to the bottom of the battery case as can happen in conventional batteries utilizing sheet-type separators. Such material accumulating in the bottom of the battery case eventually causes shorts to develop, and the life of the battery may be shortened. By collecting the material within an envelope, this problem is avoided. The envelopes also enable the battery to be somewhat smaller, since space normally provided between the plates for accumulation of such loose material may be eliminated.

The precise material used for the separator envelopes varies, but it normally has some type of rib structure for holding most of the envelope area away from the plate, and it must be porous enough so that the acid and the ions can migrate in and out of the envelope, and from plate to plate. Typical envelopes are discussed in detail in U.S. Pat. No. 3,351,495 to Larson et al. Normally, such envelopes are made of very high molecular weight polyolefins in conjunction with an inert filler material plus an oil. Sintered polyvinyl chlorides may alternatively be used for the envelope material. Another envelope material might be an impregnated fibrous type of material. In any event, the material is typically "microporous," that is, having many pores therein which are normally invisible to the naked eye. Such pores may be as large as 50 microns or so in size but are normally somewhat smaller.

Although these envelope-type battery plate separators have been used in the past, particularly in the so-called "maintenance free" batteries, the separator envelopes have not been fabricated or mounted onto the battery plates in as efficient and expeditious manner as that achieved by the present invention.

Prior art systems for fabricating battery plate envelopes often utilize adhesives to seal the edges of the envelope. The following patents typify prior art efforts which utilize adhesives: U.S. Pat. Nos. 2,271,223 to Sudo; 3,843,483 to Sendor et al; 3,900,341 to Shoichiro et al; 4,080,727 to Stolle et al; 4,125,425 to Vecchiotti et al; and U.S. Pat. No. 4,161,815 to Land et al. The systems for sealing the edges of the envelopes described in these patents exhibit many deficiencies. They are slow because of the substantial dwell time required while the adhesive sets. They can result in degradation of the envelope material, particularly where solvent adhesive is used, such as in the Vecchiotti patent. They are complicated since they inherently require some means for precisely distributing the correct amount of adhesive along the edges of the envelopes. For example, the Stolle patent provides complicated means for lifting the edges of the envelope to deposit a bead of adhesive thereon. Finally, because thermosetting resins are often used (see Sendor and Shoichiro), the envelope must often be heated so that the resin will cure and set.

Because of these difficulties with the use of adhesives, others have preferred to use heat to seam the side edges of the envelope. Typical heat seaming systems are disclosed in U.S. Pat. No. 4,216,579 to Murata and U.S. Pat. No. 2,570,677 to Honey et al. Heat sealing systems sometimes incorporate automated techniques, such as using the battery plate to fold the envelope material prior to sealing (see Murata), but there are several inherent drawbacks with these systems. First, such systems are usually expensive to operate due to the substantial consumption of energy. Second, they are slow because of the time required to heat the material. Third, they can result in degradation of the material even if precisely the right amount of heat is applied. Fourth, they require precise control of the heat application process in order to ensure a proper seal without destroying the material.

In order to overcome some of the drawbacks with earlier heat sealing systems, modern envelope fabrication systems often make use of ultrasonic waves to generate heat from the friction between the facing folds of sheet material. One such system is disclosed in U.S. Pat. No. 4,026,000 to Anderson. This system is somewhat faster than earlier designs because, as noted above, heat emanates from friction betweeen the facing envelope sheets, rather than from an external source which requires that the heat pass entirely through both layers of sheet. However, like the earlier designs, the amount of heat to be generated must be precisely measured to prevent sheet degradation. Also, the ultrasonic generators typically increase the initial cost of the system.

Hence, it is a primary object of the present invention to provide an improved envelope fabrication system which effectively and reliably overcomes the aforementioned drawbacks and limitations of the prior art proposals. More specifically, the present invention has as its objects, one or more of the following, taken individually or in combination:

(1) The provision of a method for fabricating envelopes for battery plates which is less expensive initially and which may be operated at reduced costs due to utilization of a minimum of energy during normal operation;

(2) To develop an apparatus for sealing battery plate envelopes which operates at a higher speed than conventional machines and is adaptable to mass production techniques in battery manufacture;

(3) To provide an apparatus for fabricating battery plate envelopes which do not inherently result in degradation of the envelope material during the sealing process;

(4) The provision of an envelope fabricator which is simpler and therefore less costly and more reliable than conventional machines;

(5) To provide a method and apparatus for fabricating battery plate envelopes which take advantage of the properties of the microporous material which is being utilized in the envelope; and (6) The development of a method and apparatus for sealing battery plate envelopes which provides a better seal than prior art designs.

SUMMARY OF THE INVENTION

This invention responds to the problems presented in the prior art by providing a method for fabricating battery plate envelopes from a sheet of microporous plastic material. The invention includes the following steps: (1) inserting substantially planar folding means into the sheet to fold the sheet about the folding means, with edges overlapping the folding means on both sides; (2) feeding the folded sheet toward a first and a second sealing surface, the first sealing surface comprising a pair of axially spaced, rotatably mounted, first sealing wheels; and (3) sealing the overlapping edges of the sheet by compressing the edges into one another between the first sealing wheels and the second sealing surface. The sealing is normally performed by forming a multiplicity of aligned, evenly spaced, mating indentations and projections in the facing edges of the sheet through the use of axially extending, evenly spaced gear teeth on the peripheral faces of the sealing wheels and on the sealing surfaces. So defined, the first sealing wheels compress the edges of the sheet into the second sealing surface which might, for example, comprise either a stationary, flat, toothed surface or a second pair of axially spaced, rotatably mounted, toothed sealing wheels.

The substantially planar folding means normally comprise the battery plate itself which is being pushed into place by a pusher plate. Alternatively, the folding means might comprise the pusher plate itself which folds and pushes the sheet into engagement with the sealing wheels, then retracts.

Another way to define the invention is as a method for sealing facing surfaces of microporous battery plate insulation material comprising the following steps: (1) feeding the facing surfaces edgewise toward a pair of sealing surfaces, at least one of which includes a pair of axially spaced, rotatably mounted sealing wheels, the other sealing surface acting as an anvil against which the sealing wheels are adapted to be pressed; and (2) sealing at least two edges of the facing surfaces by compressing the edges into one another between the sealing surfaces. Defined thusly, insulating sleeves, rather than envelopes could be fabricated. Such sleeves may be preferable to envelopes for certain battery applications.

The invention may alternatively be defined as an apparatus for fabricating battery plate envelopes from a folded sheet of microporous plastic material having facing folds and having a width which is greater than that of the battery to be enveloped. The apparatus includes the following components: (1) a pair of rotatably mounted pressure rollers having parallel axes, each of the rollers including two sealing wheels which are axially spaced on each of the rollers by a distance greater than the width of the battery plate but less than the width of the folded sheet, each of the sealing wheels being radially aligned at and having a periphery in close proximity to one of the sealing wheels mounted to the other of the pressure rollers, thereby defining a sealing wheel interface; and (2) means for rotating the rollers so that the side edges of the folds of the sheet are compressed into each other by the sealing wheels, thereby sealing the folds to form an envelope.

Yet another, more complete way to define the present invention is as an apparatus for fabricating battery plate envelopes from a sheet of microporous plastic suitable for use as a battery plate separator and having a width greater than that of the battery plate to be enveloped.

The apparatus defined thusly includes the following: (1) means for feeding the sheet into the apparatus; (2) a sizing section receiving the sheet from the feeding means, the sizing section comprising means for cutting the sheet into lengths which approximate twice the height of the battery plate, and creasing means for forming a fold line across the sheet, perpendicular to the length thereof and approximately bisecting the cut sheet; (3) stop means receiving the cut sheet from the sizing section for stopping the sheet and positioning for folding; (4) battery plate feed means for individually feeding battery plates edgewise into each sheet adjacent the fold line thereof; (5) means for folding the sheet about the battery plate with edges overlapping the battery plate on both sides; (6) means for receiving the folded sheet with the battery plate therein and for compressing and crimping the sheet edges into one another to form an envelope about the battery plate, said means for receiving and compressing the sheet comprising a pair of rotatably mounted pressure rollers having parallel axes, each of the rollers including two sealing gears which are axially spaced on each of the rollers by a distance greater than the width of the battery plate but less than that of the sheet, each of the sealing gears being in an engaging relation with one of the sealing gears mounted to the other of the pressure rollers, each of the rollers also including a sleeve disposed coaxially and between its sealing gears, each of the sleeves being radially aligned with and having a periphery in proximity to that of the sleeve mounted to the other of the rollers, thereby defining a sleeve interface which receives the midportion of the sheet which is enveloping the battery plate, means for adjustably forcing the rollers toward one another so that the degree of compression is regulable, and means for rotatably driving the rollers.

These and other objects, features, and advantages of the present invention will be apparent from the following description, appended claims, and annexed drawings.

BRIEF DESCRIPTION OF THE DRAWINGS

The invention will be better understood, and objects other than those set forth above will become apparent when consideration is given the following detailed description thereof. Such description makes reference to the annexed drawings wherein.

DETAILED DESCRIPTION OF THE PREFERRED EMBODIMENTS

In that form of the invention chosen for purposes of illustration in the figures, an apparatus for fabricating battery envelopes is generally indicated with the numeral 10. The apparatus 10 includes a sheet feed section 12, a sizing section 14, a battery plate feed section 16, and a sealing section 18. The sheet feed, sizing, and sealing sections 12, 14, and 18, respectively, are typically mounted in vertical alignment, with battery plate feed section 16 mounted behind and in horizontal alignment with sealing section 18. This arrangement permits sufficient space for the stacking of a large number of battery plates 20 above battery plate feed section 16 in order to permit the apparatus 10 to operate for a substantial period of time without requiring the attention of an operator. The drawings do not depict means for storing the sheet material, which typically include a sheet storage roller having tension means thereon so that the sheet 22 is under slight tension as it is pulled into the apparatus 10 by sheet feed section 12.

Figures 3, 4, 5, 6:
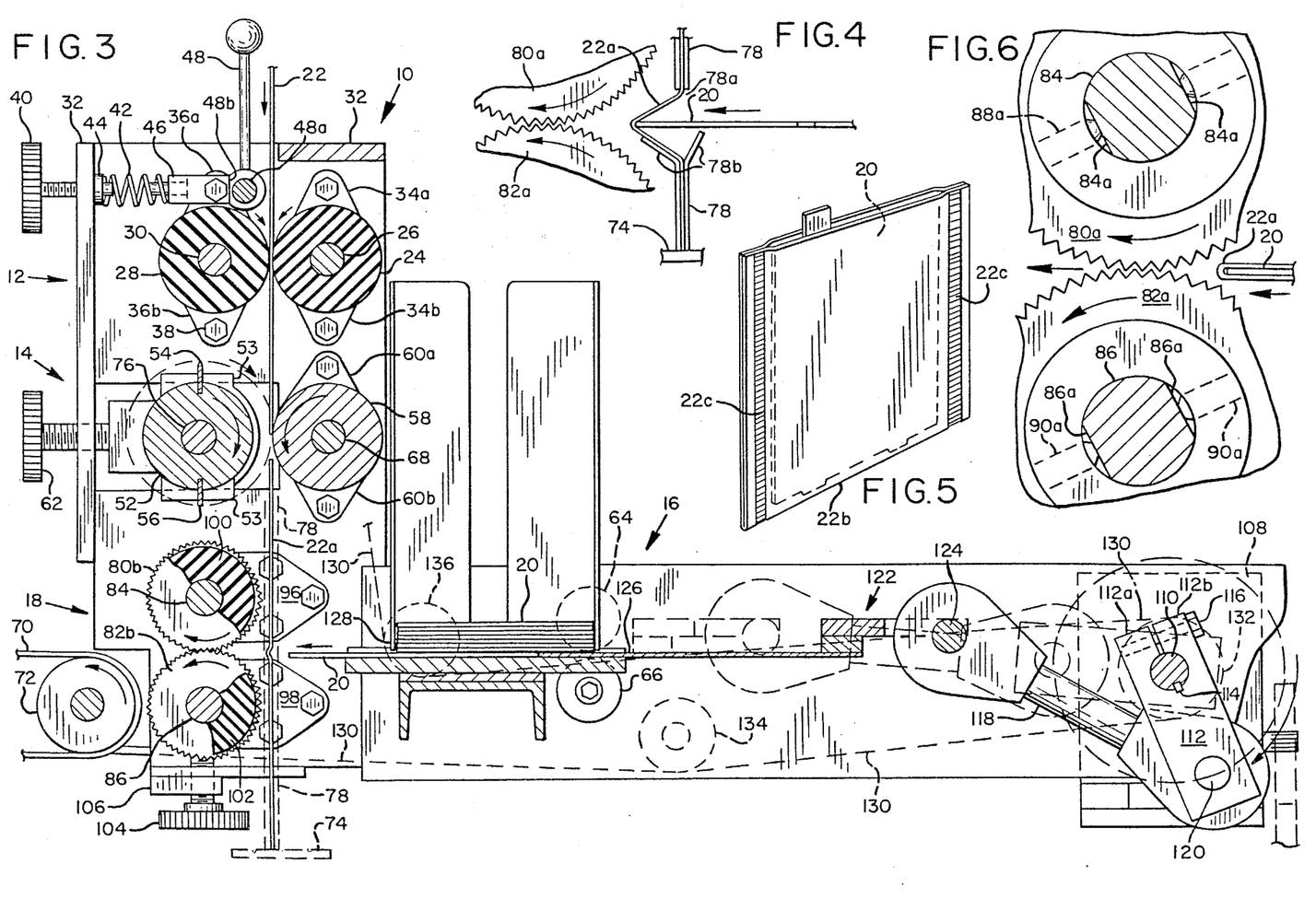
FIG. 3 is a sectional view taken along line 3—3 of FIG. 1.
FIG. 4 is a fragmentary side elevation view showing a battery plate being pushed against the fold line of a cut sheet for engagement by the sealing gears.
FIG. 5 shows a battery plate envelope formed by the embodiment of FIG. 1, including a battery plate positioned therein.
FIG. 6 is a close-up fragmentary side elevation view depicting the sealing gears.

Sheet feed section 12 includes two parallel feed rollers which are adapted to receive the sheet 22 and direct it downwardly to sizing section 14. The right hand roller (as shown in FIG. 3) is designated the feed drive roller 24 and is driven with its shaft 26 in bearings (not shown) by appropriate drive means (to be described in detail below). The other feed roller serves as an idler, and is therefore designated as the feed idler roller 28. It is mounted to a shaft 30 which is rotatably mounted by bearings 31 to an apparatus casing 32. Feed drive roller shaft 26 is rotatably mounted to casing 32 by upper and lower feed drive mounting flanges 34a and b. Feed idler roller shaft 30 is also mounted in upper and lower flanges 36a and b, but the feed idler mounting flanges permit the axis of rotation of feed idler roller 28 to be rotationally displaced with respect to casing 32 about point 38 to which lower feed idler mounting flange 36b is mounted. This simplifies start up operations, and permits regulation of the pressure exerted by the feed rollers on the sheet 22.

A pair of feed roller control wheels 40 extend outside of casing 32 to permit the operator to vary the amount of pressure exerted on the sheet 22 by the feed rollers. Each of the feed roller control wheels 40 acts through a feed pressure spring 42 which, through spring seats 44 and 46, transfers pressure from feed roller control wheel 40 to upper feed idler mounting flanges 36a. Thus, when feed roller control wheels 40 are turned in a clockwise direction, the pressure exerted by feed pressure springs 42 on upper feed idler mounting flanges 36a increases, thereby increasing the pressure exerted by feed idler roller 28 on the sheet 22.

A pressure relief lever 48 is normally included to permit feed idler roller 28 to be temporarily displaced away from feed drive roller 24 in order to permit the sheet 22 to be inserted into the apparatus 10. Pressure relief lever 48 is normally pivotally mounted to casing 32 at its lower end, which includes a flattening camming surface 48b, and a bar 48a which extends across the width of the machine and terminates in a second, aligned camming surface (not shown). Thus, displacement of the upper end 48c of pressure relief lever 48 results in displacement of upper feed idler mounting flanges 36a at each side of the apparatus 10.

The sheet 22 typically includes a flat side and a side having evenly spaced raised ribs (not shown). These ribs are included to maintain most of the surface area of the sheet 22 a slight distance away from the battery plate 20. It has been found that this enhances acid and ion migration in and out of the envelope formed by the sheet 22. In order to minimize the possibility of distortion or other damage to the ribs, one of the feed rollers normally includes a resilient cover. In the depicted embodiment, feed drive roller 24 is constructed entirely of rubber so that sheet feed section 12 is adapted to receive sheet 22 with the ribbed side being disposed toward feed drive roller 24. Thus, even if the pressure being exerted by feed idler roller 28 upon feed drive roller 24 is substantial, the ribs on sheet 22 will not be damaged.

As noted above, sizing section 14 is positioned immediately below sheet feed section 12. The central component of sizing section 14 is a sizing cylinder 52 which is mounted on a shaft 76 which, in turn, is rotatably mounted in bearings 53. Sizing cylinder 52 includes a pair of oppositely disposed, axially aligned, and outwardly extending blades. The larger of these blades is designated the cutting blade 54 since it is adapted to cut the sheet 22 to form the appropriate length for fabrication of the envelopes. The other blade is designated the creasing blade 56. It is adapted to merely form a crease in the sheet 22 in order to provide a fold line for subsequent folding of the sheet. As depicted, cutting blade 54 normally has a sharpened edge while that of creasing blade 56 is blunt or rounded. Cutting blade 54 extends slightly further than creasing blade 56 so that it completely cuts through the sheet 22. Creasing blade 56, on the other hand, extends only as far as necessary to flatten or crimp the ribs of the sheet 22 against platen roller 58. Both the cutting and creasing blades 54 and 56 cooperate with platen roller 58 which provides a solid surface against which they are adapted to operate. Platen shaft 68, to which platen roller 58 is mounted, is also rotatably mounted to casing 32 by upper and lower platen roller mounting flanges 60a and b. Platen roller 58 normally includes a chromium sheath (not shown) or a similar hard material to minimize damage to platen roller 58 during the cutting and creasing operations. Sizing cylinder 52 and platen roller 58 are driven by appropriate drive means, which will be described in detail below.

To permit the position of cutting blade 54 and creasing blade 56 to be precisely controlled with respect to platen roller 58, a pair of sizing cylinder control wheels 62 are included. One of these wheels is mounted adjacent each end of sizing cylinder shaft 76, and extends inwardly to contact one of a pair of sizing cylinder shaft bearings 53. Sizing cylinder shaft 76 is rotatably mounted to casing 32 to permit sizing cylinder shaft bearings 53, and sizing cylinder 52 carried thereby, to be displaced toward and away from platen roller 58. Thus, by turning sizing cylinder control wheels 62, the position of cutting blade 54 and creasing blade 56 with respect to platen roller 58 may be precisely controlled.

Sealing section 18 of the apparatus 10, which is positioned immediately below sizing section 14, includes a pair of vertically extending, aligned sheet guide plates 78, shown in phantom in FIG. 3, with a stop member 74 positioned therebelow. Sheet guide plates 78 are spaced to provide a channel for receiving the cut sheet 22a. They include a centrally disposed, horizontal slot 78a which, as shown in FIG. 4, is adapted to receive the battery plate 20 from battery feed section 16. Sheet guide plates 78 may be flared adjacent slot 78a to facilitate withdrawal of the cut sheet 22a therefrom. In the embodiment depicted in FIG. 4 only the lower plates are flared, at 78b, to minimize the effect of gravity on the cut sheet. The described sheet guide plates 78 and stop member 74 are sometimes referred to herein cumulatively as the stop means.

In order to minimize the possibility of the cut sheet 22a hanging up in guide plates 78, stop member 74 typically includes a plurality of air holes which are connected to a vacuum source for drawing air downwardly through the holes to thereby draw the edge of the cut sheet downwardly toward the stop member. The vacuum thus enhances the downward movement of the cut sheet 22a, which otherwise moves only by gravity and may otherwise tend to hang up as a result of static electricity. It also minimizes the possibility of wrinkling when lightweight sheet material is used. These air holes and the vacuum source have not been depicted in order to simplify the drawings.

Figure 1:
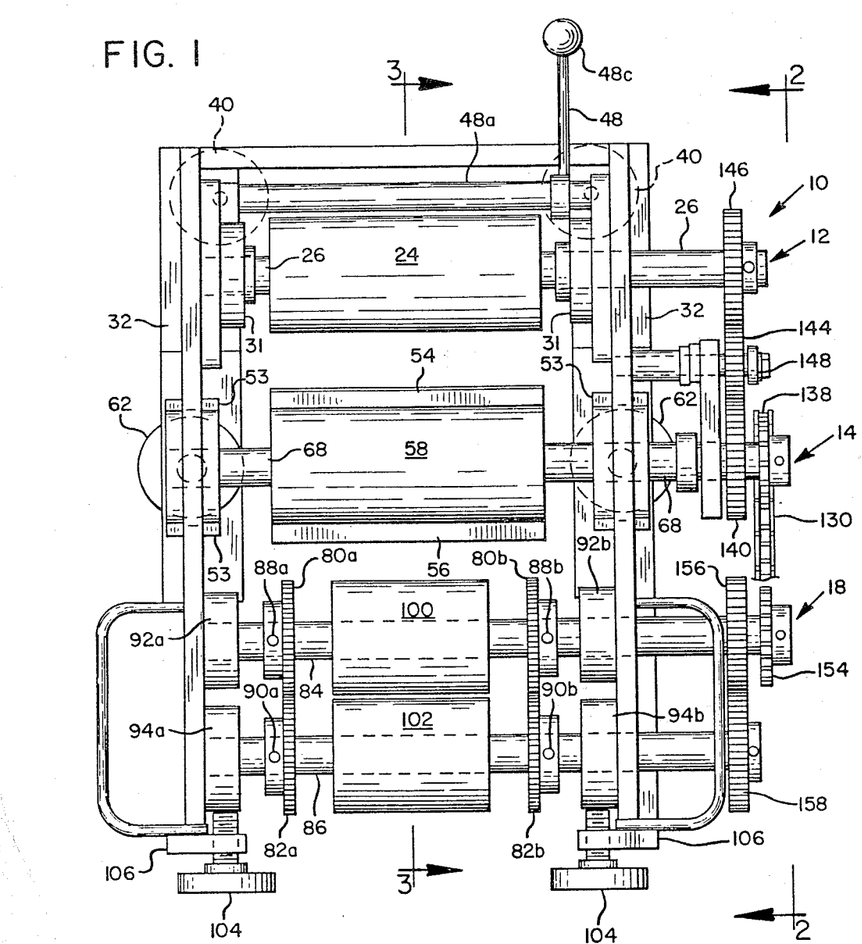
FIG. 1 is an end elevation view of one embodiment of the present invention.

As shown in FIG. 1, axially spaced sealing gears 80a and b and 82a and b are mounted to sealing shafts 84 and 86, respectively, by set screws 88a and b and 90a and b, respectively. Sealing shafts 84 and 86 are provided with flats 84a and 86a to facilitate the use of set screws. Bearings 92a and b and 94a and b rotatably mount each of the sealing shafts 84 and 86 to casing 32 via sealing shaft mounting flanges 96 and 98. Sleeves 100 and 102 are mounted to each of the sealing shafts 84 and 86 midway between sealing gears 80a and b or 82a and b, as shown in FIG. 1. These sleeves 100 and 102 are normally formed of resilient material, such as a rubberized compound, to adapt the sleeves to receive the central portion of the cut sheet 22a which envelops the battery plate 20 to assist in conveying the sheet and plate through the sealing section 18.

A pair of compression control wheels 104, which are rotatably mounted to casing 32 by flanges 106, permit lower sealing shaft 86, sealing gears 82a and b and sleeve 102 to be displaced slightly toward corresponding components mounted to sealing shaft 84. As will be explained in detail below, this increases the degree of compression exerted on the cut sheet 22a by sealing gears 80a and b and 82a and b. In order to accommodate such movement, sealing shaft 86 is mounted to casing 32 to prevent a certain amount of sliding movement.

A belt-like conveyor 70, driven by a conveyor drive roller 72, is provided immediately downstream of sealing section 18 to convey the now sealed envelope 22b from the sealing section.

The battery plate feed section 16 of apparatus 10 will now be described. Since it is of conventional design, however, it will not be given extensive treatment herein. The battery plate feed section 16 includes a block 108 to which a drive shaft 110 is rotatably mounted. A motor (not shown) is drivingly connected to drive shaft 110. A connecting arm 112 is fixed about drive shaft 110 by a key 114 and a mounting bolt 116. Connecting arm 112 is split adjacent drive shaft 110, so that mounting bolt 116 rigidly holds the two halves 112a and b together. Connecting arm 112 is rotatably mounted to a connecting rod 118 by a connecting bearing 120. The opposite end of connecting rod 118 is mounted to a slide assembly 122 by a slide bearing 124. The slide assembly 122 includes a slide plate 126 which is adapted to individually feed battery plates 20 into sealing section 18 of the apparatus 10. Slide assembly 122 also includes upper and lower slide plate rollers 64 and 66 which slidingly engage slide plate 126. A gate 128 is disposed immediately between the stack of battery plates 20 and sealing section 18. This gate 128 is positioned in proximity to slide plate 126 with a clearance which is only slightly greater than the thickness of a battery plate 20. Therefore, as drive shaft 110 is rotated, slide plate 126 reciprocates toward and away from sealing section 18 to consecutively feed individual battery plates 20 into sealing section 18.

The mechanism for driving the components of apparatus 10 will now be described. Primary reference should be made to FIG. 2 for this discussion, but some of the components are shown in phantom in FIG. 3, and most of the drive gears are depicted in FIG. 1. An endless drive chain 130 extends from a sprocket 132 mounted coaxially with drive shaft 110. Chain 130 is directed through battery feed section 16 by guide sprockets 134 and 136.

Figure 2:
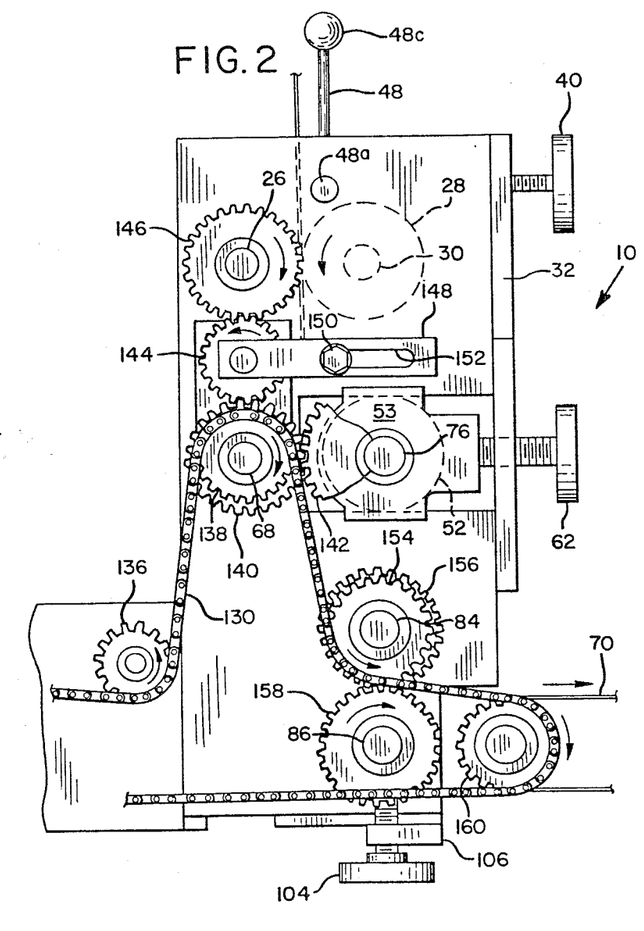
FIG. 2 is a sectional view taken along line 2—2 of FIG. 1.

As shown in FIG. 2, a platen roller sprocket 138 is mounted to one end of platen roller shaft 68. A platen roller drive gear 140 is also mounted to platen roller shaft 72 behind platen roller sprocket 138. Platen roller drive gear 140 engages a sizing cylinder drive gear 142 mounted to sizing cylinder shaft 76. Platen roller drive gear 140 also engages an idler gear 144 which, in turn, engages a replaceable feed drive roller drive gear 146 which is mounted to feed drive roller shaft 26. Idler gear 144 is rotatably mounted to a mounting plate 148 which is slidably mounted to casing 32 by mounting bolt 150. Mounting plate 148 includes a slot 152 so that by loosening mounting bolt 150, idler gear 144 can be moved out of engagement with feed drive roller drive gear 146 so that gear 146 can be replaced with a larger or smaller gear. This will change the relative speed of rotation between sizing cylinder 52 and feed rollers 24 and 28. Thus, a longer or shorter sheet will be cut by sizing section 18 depending upon whether the new feed roller drive gear is smaller or larger than the original gear. In any event, it is normal that sizing cylinder 52 rotates at a speed such that during cutting operations, a slight downward tension will be exerted on sheet 22 by cutting blade 54 so that even if sheet 22 is not completely cut, the downward pulling of the cutting blade will tear the sheet 22 along the desired line.

From the platen roller sprocket 138, drive chain 130 passes downwardly across a sealing shaft sprocket 154 which is mounted to one end of upper sealing shaft 84. Sealing shaft drive gears 156 and 158 are mounted to upper and lower sealing shafts 84 and 86, respectively, so that this drive is transmitted to lower sealing shaft 86.

The gear teeth of platen roller drive gear 140, sizing cylinder driven gear 142, and sealing shaft drive gears 156 and 158 are all shaped to permit a certain amount of movement between those components which have hereinabove been described as being relatively displaceable.

From sealing shaft sprocket 154, drive chain 130 passes around a conveyor sprocket 160 which, through conveyor drive roller 72, operates conveyor 70.

OPERATION

The operation of the apparatus 10 will now be described. Before starting the apparatus a sufficient supply of microporous sheet 22 should be provided, on a sheet supply roller (not shown) positioned adjacent the apparatus. A sufficient number of battery plates should also be positioned in battery plate feed section 16. The proper compression setting is made through the use of compression control wheels 104. An appropriately sized feed drive roller drive gear 146 should be installed to correspond to the height of the battery plate to be enveloped. In order to change gear 146, bolt 150 is loosened, and idler gear 144 is slid outwardly on its mounting plate 148, thereby disengaging idler gear 144 and feed drive roller drive gear 146. Once gear 146 is replaced, mounting plate 148 is returned to its original position and bolt 150 is tightened.

The microporous sheet 22 may then be threaded into apparatus 10 adjacent the interface of feed drive roller 24 and feed idler roller 28 by pivoting the upper end 48a of pressure relief lever 44. The camming face 48b displaces feed pressure spring seat 46 to the left (FIG. 3), slightly rotating the axis of feed idler roller 28 about pivot point 38. This provides a spacing between feed drive roller 24 and feed idler roller 28 into which the sheet 22 may be inserted. Pressure relief lever 48 is then released, and feed pressure spring 42 returns feed idler roller 28 to its original position, now exerting a pinching pressure on sheet 22.

The drive motor is then activated, thus causing drive shaft 110 to rotate. Drive chain 130 causes feed drive roller 24 to rotate in a counterclockwise direction (in FIG. 3), thus feeding sheet 22 downwardly toward sizing section 14. The downward movement of sheet 22 also causes the feed idler roller 28 to rotate. Feed pressure spring 38 maintains a constant pressure on sheet 22 as it is fed through the feed rollers.

As the sheet 22 is fed downwardly into sizing section 14, sizing cylinder 52 and platen roller 58 are rotating at a somewhat greater speed than the feed rollers. By the time a length of sheet which is approximately equal to the height of the battery plate 20 has passed the sizing cylinder 52, creasing blade 56 begins to contact the sheet 22 and crimps it against platen roller 58. This flattens the ribs along a line which becomes the fold line for the envelope. As sizing cylinder 52 continues to rotate a second length of sheet 22 which is also approximately equal to the height of the battery plate, passes through sizing section 14 until cutting blade 54 comes into contact with sheet 22, thus cutting sheet 22 against platen roller 58. In the event the cut is not complete, the fact that sizing cylinder 52 is rotated at a higher rate of speed than the feed rollers means that the sheet will be pulled or torn along the cut line.

The cut sheet 22a drops downwardly by gravity and by the vacuum draw of the stop means, from sizing section 14 into sheet guide 78 of sealing section 18. When the cut sheet 22a contacts stop member 74, it is ready for insertion of the battery plate 20.

By the time the cut sheet 22a reaches the position depicted in FIG. 3, connecting rod 118 and slide plate 126 will also be in the position depicted in FIG. 3, and insertion of a battery plate 20 edgewise into the fold line of the cut sheet 22a will begin. Gate 128 prevents more than one battery plate 20 from being inserted into any one cut sheet. FIG. 4 depicts a battery plate 20 as it is moved into contact with the cut sheet 22a. It can be be seen that the battery plate 20 pulls the cut sheet 22a from sheet guide 78. At this point in the operation, valve means (not shown) may be used to cut off the vacuum draw through stop member 74, but such means are normally not included because the vacuum draw does not normally affect the even feeding of the cut sheet into sealing section 18.

Once the cut sheet 22a with the battery plate 20 is pushed as far as the interface of sealing gears 80a and b and 82a and b and sleeves 100 and 102, the sheet will be grasped and fed through the sealing section 18. Thus, the sealing gears engage and compress the adjacent folds of the cut sheet 22a into each other to form continuous crimps 22c along each side of the battery plate 20. Sleeves 100 and 102 flatten the envelope, thereby preventing any misalignment or distortion of the folds of the envelope 22b which might occur if the mid-portion of the cut sheet was permitted to fall away from the battery plate. Since sleeves 100 and 102 are normally resilient, they will not damage the battery plate 20 as it is fed through sealing section 18. Once the enveloped battery plate passes out of sealing section 18, it is immediately carried away by conveyor 90.

The present invention thus seals the two folds of cut sheet 22a to each other through the use of compression, without requiring the utilization of heat or adhesives. As presently understood, it is believed that the application of substantial compression to the two folds of cut sheet 22a results in collapse of the micropores within the plastic material being used. The term "plastic" as used herein means a material which, when subjected to compression at ambient temperatures, will flow before it will crack or break. Normally, the separator material is composed of very high molecular weight polyolefin, with an inert filler and oil, although other plastic material may alternatively be used (see U.S. Pat. No. 3,351,495 for a discussion of other suitable materials). Before collapse of the micropores is complete, a substantial amount of material from the adjacent fold apparently passes or flows into the micropores of the adjacent sheet. Thus, once compression is completed, the two sheets are integrally sealed into one another.

The amount of compression which is utilized in the present invention will vary depending upon the materials which are utilized. However, the compression must be greater than the yield strength of the sheet and must be within the range of plastic flow; that is, the compression must at least equal the force which results in compression of the micropores. A compression of from 6,000 to 10,000 psi is normally within this range, but other lesser or greater pressures may be utilized. As pressure is applied to the folds of the cut sheet 22a, the thickness of the plastic material becomes reduced. Because of this flattening effect, the surface area of the compressed portion of this sheet tends to expand. The teeth of sealing gears 80a and b and 82a and b take advantage of this increased surface area to form a series of interlocking indentations and projections, thereby compounding mechanical sealing with the sealing effect of the flow of plastic from one fold into the micropores of the adjacent fold.

The depicted embodiment includes 90° gear teeth, that is, gear teeth with contained angles of 90°. While not accurately depicted in the drawings, the preferred arrangement is to include 15 teeth for each inch of sealing gear periphery, with a sealing gear diameter of three inches. However, different gear tooth configurations may be desirable under certain circumstances. In any event, the mating indentations and projections should be positioned and sized such that the clearance between the opposed, compressing surface be a constant across the entire width of the sheet. The configuration and sizing of the teeth on the depicted sealing wheels are such that the clearance is equal across several of the adjacent teeth (see FIGS. 4 and 6). This maintains the compression for a longer period, and is another reason why the depicted embodiment is the preferred one. Nonetheless, it should be appreciated that any type of face configuration including mating indentations and projections may be utilized. In fact, the invention has been found to successfully operate even without the presence of such indentations and projections; that is, when two flat sealing wheels (not shown) are utilized, a seal may often be effected due to the flow from one fold of the sheet into the other. This is not the preferred arrangement, however, since this aspect of the invention does not take advantage of the increased surface area caused by the compression.

Also, it should be appreciated that it may be possible in certain instances to substitute other sealing means which can create sufficient compression for sealing. Such other means might include a pivotable clamp. However, it is believed that the depicted arrangement is more suitable for automation since it provides for continuous fabrication of battery plate envelopes and simultaneous insertion of battery plates into such envelopes at a rate of speed which exceeds that of any of the prior art designs.

In a variation of the depicted embodiment (which variation is not depicted), the apparatus might be adapted to form battery envelopes without the use of the battery plates to form the envelopes. In this variation the slide plate 126 would be long enough to contact the sheet 22a and, in an extended position, would push the midportion of the sheet into engagement with sealing gears 80a and b and 82a and b, thus simultaneously forming a fold line. Once sheet 22a is engaged, the slide plate would then retract. In all other respects, the structure and operation of this alternate embodiment would be the same as that depicted.

Of course, it should be understood that various changes and modifications of the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A method for fabricating battery plate envelopes from a sheet formed of microporous plastic material having a width greater than that of the battery plate to be enveloped, comprising:
    pushing a battery plate edgewise into the sheet to fold the sheet about the battery plate with edges overlapping the battery plate on both sides;
    feeding the folded sheet with the battery plate therein into the interface between a pair of opposed pressure rollers, each of which includes a pair of axially aligned sealing wheels; and
    continuously sealing the overlapping edges of the sheet by compressing the edges into one another between the sealing wheels, the compressive force being applied uniformly along the entire extent of said overlapping edges and being within the range of the plastic flow of the material.

2. The method of claim 1 wherein the step of sealing the overlapping edges includes forming mating indentations and projections in the facing edges of the sheet through the use of mating indentations and projections on the peripheral faces of the sealing wheels.

3. The method of claim 2 wherein the step of forming mating indentations comprises forming a multiplicity of aligned, evenly spaced, mating indentations and projections in the facing edges of the sheet through the use of gear teeth on the peripheral faces of the sealing wheels, the gear teethed shaped and spaced so that the clearance between opposing sealing wheels remains constant during wheel rotation.

4. The method of claim 3 further comprising forming a fold line across the sheet, perpendicular to the length of the sheet, and wherein the battery plate is pushed into the sheet at the fold line.

5. The method of claim 3 wherein the compression exerted on the edges of the sheet exceeds the yield strength of the sheet.

6. The method of claim 3 wherein the compression exerted on the edge of the sheets is at least 6,000 psi.

7. The method of claim 4 further comprising cutting the sheet to a length which approximates double the height of the battery plate to be enveloped, and wherein a fold crease is formed proximate the mid-point of the length of the cut sheet.

8. The method of claim 7 wherein the cutting comprises a rotary cutting process in which the sheet is pulled in tension along its length so that in the event the cut is not complete, the sheet will be torn along the cut line formed during the cutting.

9. An apparatus for fabricating battery plate envelopes from a folded sheet of microporous plastic material having facing folds and having a width which is greater than that of the battery plate to be enveloped, said apparatus comprising:
    a pair of opposing rotatably mounted pressure rollers having parallel axes, each of said rollers including two sealing wheels which are axially spaced on each of said rollers by a distance greater than the width of the battery plate but less than the width of the folded sheet, each of said sealing wheels being radially aligned with one of the sealing wheels mounted on the other of said pressure rollers, said aligned rollers being arranged such that the clearance therebetween remains constant throughout the entire rotational travel of said rollers thereby defining a constant sealing wheel interface, said sealing wheels being adapted to receive the side edges of the folded sheet at their interface; and
    means for rotating said rollers so that the edges of the sheet are compressed into each other by said sealing wheels, thereby continuously sealing the edges to form an envelope.

10. The apparatus of claim 9 further comprising means for adjustably forcing said rollers toward one another so that the degree of compression of said sealing wheels on the folds is regulable.

11. The apparatus of claim 10 wherein said sealing wheels comprise gears having a multiplicity of teeth on their peripheries, said teeth shaped and spaced to maintain the constant clearance therebetween, whereby said teeth form a multiplicity of mating indentations and projections in the facing folds of the sheet.

12. A method for sealing facing surfaces of a microporous battery plate insulation material comprising:
    feeding the facing surfaces edgewise toward a pair of sealing surfaces, at least one of which includes a rotatably mounted sealing wheels, the other sealing surface acting as an anvil against which the sealing wheel is adapted to be pressed; and
    sealing at least two edges of the facing surfaces by continuously compressing the edges into one another between said pair of sealing surfaces, the compressive force being applied uniformly along the entire extent of said overlapping edges.

13. The method of claim 12, further comprising the additional step of first folding a sheet of microporous insulation material by inserting substantially planar folding means into the center region of the sheet to fold the sheet over the folding means, so that the two folded halves of the sheet comprise the facing surfaces of insulation material.

14. The method of claim 12 further comprising the additional step of sealing a third edge of each of the facing surfaces by compressing the third edges into one another.

15. A method for fabricating battery plate envelopes from a sheet formed of microporous plastic material having a width greater than that of a battery plate to be enveloped, comprising:
  inserting substantially planar folding means into the sheet to fold the sheet about the folding means, with edges overlapping the folding means on both sides;
  feeding the folded sheet toward a first and second sealing surface, said first sealing surface comprising a pair of axially spaced, rotatably mounted, first sealing wheels; and
  sealing the overlapping edges by compressing the edges into one another between the first sealing wheels and the second sealing surface, the compressive force being applied uniformly along the entire extent of said edges.

16. The method of claim 15 wherein the step of sealing the overlapping edges includes forming mating indentations and projections in the facing edges of the sheet through the use of mating indentations and projections on the peripheral faces of the first sealing wheels and on the second sealing surface.

17. The method of claim 22 wherein the second sealing surface comprises a pair of axially spaced, rotatably mounted, second sealing wheels and wherein the step of forming mating indentations comprises forming a multiplicity of aligned, evenly spaced, mating indentations and projections in the facing edges of the sheet through the use of evenly spaced gear teeth on the peripheral faces of the sealing wheels, the gear teeth shaped and spaced so that the clearance between opposing sealing wheels remain constant during wheel rotation.

18. The method of claim 17 wherein the folded sheet is fed toward the sealing surfaces by extending the folding means toward the sealing surfaces at least until the sheet is engaged by the surfaces.

19. The method of claim 17 wherein the folding means comprise means for pushing a battery plate into the sheet to fold the sheet about the battery plate, and wherein the folded sheet is fed toward the sealing surfaces with a battery plate therein.

20. The method of claim 15 further comprising the initial step of vacuum drawing the sheet into the presence of the folding means.

* * * * *

UNITED STATES PATENT AND TRADEMARK OFFICE
CERTIFICATE OF CORRECTION

PATENT NO. : 4,407,063

DATED : October 4, 1983

INVENTOR(S) : Peter E. Johnson

It is certified that error appears in the above-identified patent and that said Letters Patent are hereby corrected as shown below:

Col. 10, line 7     Change "90" to --70--.

Col. 14, line 4     Change "22" to --16--.

Signed and Sealed this

Twelfth Day of February 1985

[SEAL]

Attest:

DONALD J. QUIGG

*Attesting Officer*     *Acting Commissioner of Patents and Trademarks*